United States Patent
Wang et al.

(10) Patent No.: US 12,036,702 B1
(45) Date of Patent: Jul. 16, 2024

(54) DEVICE FOR DESULFURIZING AND PLASTICIZING WASTE RUBBER

(71) Applicant: Mianyang Ruiyang New Material Technology Development Co., Ltd, Mianyang (CN)

(72) Inventors: Duoxiao Wang, Mianyang (CN); Gaorui Ren, Mianyang (CN); Bo Li, Mianyang (CN); Li Wang, Mianyang (CN)

(73) Assignee: Mianyang Ruiyang New Material Technology Development Co., Ltd, Mianyang (CN)

( * ) Notice: Subject to any disclaimer, the term of this patent is extended or adjusted under 35 U.S.C. 154(b) by 0 days.

(21) Appl. No.: 18/422,124

(22) Filed: Jan. 25, 2024

(30) Foreign Application Priority Data

Feb. 16, 2023 (CN) .......................... 202310124082.X

(51) Int. Cl.
| | |
|---|---|
| B29B 13/02 | (2006.01) |
| B01F 35/93 | (2022.01) |
| B29B 7/14 | (2006.01) |
| B01F 101/00 | (2022.01) |
| B29B 13/00 | (2006.01) |
| B29K 19/00 | (2006.01) |

(52) U.S. Cl.
CPC .............. *B29B 13/02* (2013.01); *B01F 35/93* (2022.01); *B29B 7/14* (2013.01); *B01F 2101/2805* (2022.01); *B29B 2013/002* (2013.01); *B29K 2019/00* (2013.01)

(58) Field of Classification Search
None
See application file for complete search history.

(56) References Cited

U.S. PATENT DOCUMENTS 5,904,885 A * 5/1999 Arastoopour ......... B29C 48/395
264/912

FOREIGN PATENT DOCUMENTS

| CN | 101434710 B | | 5/2009 |
| CN | 106827444 A | * | 6/2017 |

OTHER PUBLICATIONS

Lin H. CN106827444A-translated document (Year: 2017).*

* cited by examiner

*Primary Examiner* — Jelitza M Perez
(74) *Attorney, Agent, or Firm* — Jeenam Park

(57) ABSTRACT

The present invention discloses a device for desulfurizing and plasticizing waste rubber in the field of waste rubber processing. The device comprises a body, wherein the body comprises a top plate, a treatment body and a first pump assembly, the treatment body consists of a circular barrel and an arc barrel, the circular barrel is fixedly connected to a top of the arc barrel, a barrel wall of the circular barrel is made of a double-layer ring plate, a heating pipe spirally arranged is fixedly connected to a connection between an inner-layer ring plate and an outer-layer ring plate; a cutout pipe is arranged on the top plate, the cutout pipe is cut from a side wall of the top plate. The present invention has a simple structure and can reduce the loss of the device by preheating the rubber powder.

7 Claims, 5 Drawing Sheets

DEVICE FOR DESULFURIZING AND PLASTICIZING WASTE RUBBER

CROSS-REFERENCE TO RELATED APPLICATIONS

This application claims priority to Chinese Patent Application No. 202310124082.X, filed on Feb. 16, 2023, which is hereby incorporated by reference in its entirety.

TECHNICAL FIELD

The present invention belongs to the field of waste rubber processing, and particularly relates to a device for desulfurizing and plasticizing waste rubber.

BACKGROUND

As an important strategic material, rubber is strictly controlled by various countries. China is a country with large rubber use and also a country with extremely deficient rubber resources and extremely large waste rubber production. In order to solve the shortage of rubber resources in China, China has always advocated, encouraged and supported the recycling of rubber and the production of reclaimed rubber. Rubber powder is an intermediate product of waste rubber recycling and an important resource for reclaimed rubber. Therefore, the quality of rubber powder determines the quality of reclaimed rubber.

Thus, Chinese Patent Application No. CN101434710B discloses an automatic rubber powder plasticizing process for plasticizing rubber powder in recycling and processing waste rubber. This process comprises crushing waste rubber into 10-40 meshes of rubber powder, adding an activating agent and a softening agent, uniformly mixing the rubber powder, the activating agent and the softening agent in a weight ratio of 1:0.3-0.4%:8-18%, heating to 180-320° C., keeping at this temperature for 8-15 minutes, performing desulfurization and plasticization, and cooling to obtain plasticized rubber powder. The present invention further provides a device for plasticizing treatment. This device comprises a stirring device (1), a feeding device (2), a thermal reaction device (3) and a cooling device (4) which are communicated in sequence. This process is simple, can achieve automatic continuous production, has no pressure, no waste gas emission and no pollution, is safe and reliable, has stable quality and is easy to control. The treated plasticized rubber powder can be directly used for the production of rubber products without dehydration, thereby saving energy, reducing consumption, having less investment and low cost. The device according to the above patent application can achieve automatic continuous production, and has the advantages of a simple structure, convenient operation, easy control and low cost.

However, when the device performs high-temperature plasticizing treatment on the rubber powder, the rubber powder in the feeding device is directly conveyed to the thermal reaction device for high-temperature treatment, wherein since the temperature is higher during the high-temperature plasticizing of the rubber powder, the rubber powder is directly put into the thermal reaction device, and a temperature in the thermal reaction device is immediately increased; consequently, this will cause greater loss of the thermal reaction device to a certain extent.

SUMMARY

In order to solve the above problems, an objective of the present invention is to provide a device for desulfurizing and plasticizing waste rubber, so as to reduce the loss of the device by preheating the rubber powder.

In order to achieve the objective, a technical solution of the present invention is as follows: a device for desulfurizing and plasticizing waste rubber comprises a body, wherein the body comprises a top plate, a treatment body and a first pump assembly, the treatment body consists of a circular barrel and an arc barrel, the top plate is fixedly connected to a top of the circular barrel, the circular barrel is fixedly connected to a top of the arc barrel and communicated with the arc barrel, a heat insulation layer is fixedly connected to a connection between the circular barrel and the arc barrel, a barrel wall of the circular barrel is made of a double-layer ring plate, a heating pipe spirally arranged is fixedly connected to a connection between an inner-layer ring plate and an outer-layer ring plate, the heating pipe on an upper portion of the double-layer ring plate is communicated with the first pump assembly, and a heater is communicated between the heating pipe and the first pump assembly; and a cooling pipeline is arranged in a barrel wall of the arc barrel and communicated with a refrigerator, a discharge port is formed in a bottom of the arc barrel, and a closing cover is detachably connected to the discharge port.

A top of the top plate is communicated with an agent inlet pipeline, the agent inlet pipeline is communicated with a second pump assembly filled with an activating agent and a softening agent, a cutout pipe is arranged on the top plate, the cutout pipe is cut from a side wall of the top plate, one end of the cutout pipe is communicated with a third pump assembly filled with rubber powder, the other end of the cutout pipe is communicated with an annular pipe, the annular pipe is positioned in the side wall of the top plate, and the annular pipe penetrates through the side wall and a bottom wall of the top plate and is communicated with the inside of the circular barrel; and a stirring assembly is arranged in the circular barrel, and a drive assembly that drives the stirring assembly is arranged on the top of the circular barrel.

The principle and beneficial effects of the basic solution are as follows: during operation, the third pump assembly is firstly started, and rubber powder flows into the circular barrel from the cutout pipe under the drive of the third pump assembly; meanwhile, since the cutout pipe is cut from the side wall of the top plate, other end of the cutout pipe is communicated with the annular pipe, and the annular pipe is positioned in the side wall of the top plate, the rubber powder can move along a pipe wall of the annular pipe, and the rubber powder can flow through the annular pipe at a high speed under the pressure of the third pump assembly, so that large friction is generated between the rubber powder and an inner wall of the annular pipe. According to the frictional heat generation, the rubber powder can generate heat, so that the rubber powder can be preheated, which can improve the efficiency of subsequent desulfurization and plasticization operations in one aspect and reduce the loss of the device in another aspect.

After the rubber powder is injected, the second pump assembly is started, and the activating agent and the softening agent flow into the circular barrel from the agent inlet pipeline under the drive of the second pump assembly; meanwhile, the first pump assembly is started, gas flows into the heater under the drive of the first pump assembly, and the heated gas flows into the heating pipe, so that the temperature of the circular barrel increases; and meanwhile, the drive assembly is started, and the rubber powder is plasticized at a high temperature by stirring of the stirring assembly.

Further, the stirring assembly comprises a rotating shaft driven by the drive assembly, the rotating shaft penetrates through the top plate and extends to the arc barrel, a first ball bearing is fixedly connected to a contact position between the rotating shaft and the top plate, the first ball bearing is sleeved on the rotating shaft, and an outer wall of the first ball bearing is fixedly connected to the top plate;

a plurality of auxiliary blocks are arranged at a part that is the rotating shaft and that is positioned at the circular barrel, stirring assemblies are symmetrically and fixedly connected to two sides of the auxiliary block, and an auger blade is fixedly connected to a part that is of the rotating shaft and that extends to the arc barrel.

The principle and beneficial effects of the basic solution are as follows: the rotating shaft rotates under the drive of the drive assembly, so that the stirring assembly can stir the rubber powder under the drive of a motor and mix the rubber powder with the activating agent and the softening agent; and meanwhile, the auger blade drives the plasticized rubber powder to be output under the drive of the rotating shaft, and the design of the first ball bearing can prevent the rotation of the rotating shaft from affecting the stability of the top plate.

Further, the drive assembly comprises a motor, the motor is fixedly connected to the top of the top plate, a driving bevel gear is coaxially fixedly connected to an output shaft of the motor, a driven bevel gear is engaged with the driving bevel gear, and the driven bevel gear is positioned at a center of the top plate and is coaxially fixedly connected to the rotating shaft.

The principle and beneficial effects of the basic solution are as follows: the motor is started, the driving bevel gear will rotate, and therefore, the rotating shaft rotates under the drive of the motor because the driving bevel gear is engaged with the driven bevel gear and the rotating shaft is coaxially and fixedly connected to the driven bevel gear.

Further, a second ball bearing is sleeved on the rotating shaft, the second ball bearing is positioned above the auger blade, a fixed block is fixedly connected to an outer wall of the second ball bearing, a filter plate is fixedly connected to an outer wall of the fixed block, the filter plate is fixedly connected to a side wall of a lower portion of the circular barrel, a plurality of filter holes are formed in the filter plate, and the filter holes are distributed in a dispersed manner with a center of the filter plate as a base point.

The principle and beneficial effects of the basic solution are as follows: when being plasticized to a suitable size, the rubber powder will flow to the filter holes and into the arc barrel, then a large amount of rubber powder will flow to a middle because the filter holes are distributed in a dispersed manner with a center of the filter plate as a base point, and therefore, the design of the filter plate can prolong the treatment time of rubber powder in the circular barrel in one aspect, so that the rubber powder can be fully plasticized at a high temperature, and can play a certain role in guiding the rubber powder in another aspect. Further, the stirring assembly consists of a first plate and a second plate, both the first plate and the second plate contact an inner wall of the circular barrel, the first plate is positioned above the second plate, a plurality of torsion springs are uniformly and fixedly connected to a bottom portion of the first plate, a shift sheet is fixedly connected to one end that is of the torsion spring and that is far away from the first plate, the shift sheet is positioned between the first plate and the second plate, a plurality of shift levers corresponding to a position of the shift sheet are arranged on a wall of the circular barrel, and each shift lever can contact the shift sheet.

The principle and beneficial effects of the basic solution are as follows: when the rotating shaft rotates, the first plate and the second plate rotate under the drive of the rotating shaft; meanwhile, since the shift sheet is arranged between the first plate and the second plate and the shift lever that can contact the shift sheet is arranged on a wall of the circular barrel, the shift sheet will contact the shift lever during rotation, then the shift sheet is twisted forward under the fluctuation of the shift lever, and part of the rubber powder is shifted under the twisting of the shift sheet, so that the rubber powder can be fully mixed and desulfurized and plasticized in the circular barrel, the desulfurization and plasticization efficiency of the rubber powder is accelerated; and then since a torsion spring is arranged on the shift sheet, in when the shift lever is far away from the shift sheet, the shift sheet will return to its original position, and the next shift operation cannot be affected.

Further, a sliding rod is fixedly connected to the top of the fixed block, an arc groove corresponding to the sliding rod is arranged inside the auxiliary block positioned above the fixed block, the auxiliary block and the fixed block are vertically matched in a sliding manner through the sliding rod and the arc groove, and a connecting rod is fixedly connected between adjacent auxiliary blocks.

The principle and beneficial effects of the basic solution are as follows: when the rotating shaft rotates, the arc groove in the auxiliary block rotates due to the design of the sliding rod and the arc groove, when a higher position of the arc groove contacts the sliding rod, the auxiliary block moves upwards under a pushing action of the sliding rod; meanwhile, the connecting rod is fixedly connected between adjacent auxiliary blocks, so that a plurality of auxiliary blocks vertically move upwards under the pushing action of the sliding rod, and the first plate and the second plate vertically move upwards and vice versa; therefore, under a vertical reciprocating motion of the first plate and the second plate, the rubber powder in the circular barrel can be stirred uniformly, this can enable the rubber powder partially falling to the lower portion to be stirred again, and can prolong the staying time of the rubber powder at the upper portion of the circular barrel in the circular barrel, so that the rubber powder is fully heated and plasticized by a high temperature; and the sufficiently plasticized rubber powder at the lower portion of the circular barrel moves to the filter plate under the extrusion of the first plate and the second plate, so that the rubber plasticizing efficiency is accelerated.

Further, a blocking piece is fixedly connected to one end that is of the annular pipe and that is far away from the cutout pipe, and a plurality of through holes are formed on the blocking piece.

The principle and beneficial effects of the basic solution are as follows: when the rubber powder flows to the blocking piece, the rubber powder will dispersedly flow into the circular barrel under a diversion action of the through hole, so that the rubber powder can be uniformly dispersed in the circular barrel, and thus the rubber powder is treated uniformly.

Further, a lower portion that is of the arc barrel and that is close to the discharge port is circumferentially communicated with a plurality of spraying pipelines, and one-way valves are arranged on the spraying pipelines.

The principle and beneficial effects of the basic solution are as follows: when the plasticized rubber powder needs to be output, the one-way valve is opened, the plasticized rubber powder flows out along with the spraying pipeline, and the plurality of spraying pipelines are circumferentially arranged, so that in one aspect, collection of plasticized rubber powder can be facilitated, and in another aspect, outflow of the plasticized rubber powder can be accelerated.

Further, the other end of the first pump assembly is communicated with a heating pipe at a lower portion of the double-layer ring plate.

The principle and beneficial effects of the basic solution are as follows: a hot gas in the heating pipe can be circulated to the first pump assembly, thereby achieving gas recycling.

Further, the device for desulfurizing and plasticizing waste rubber further comprises a fourth pump assembly, the fourth pump assembly is communicated with a vortex tube, two ends of the vortex tube are respectively a cold air end and a hot air end, the cold air end of the vortex tube is communicated with the cooling pipeline through a communicating pipe, the hot air end of the vortex tube is communicated with the heater, the heater is communicated with a pressure relief valve, the pressure relief valve is communicated with a diverter connection pipe, and the diverter connection pipe is communicated with the spirally arranged heating pipe.

The principle and beneficial effects of the basic solution are as follows: with the design of the vortex tube, the vortex tube can input cold air into the cooling pipeline under the drive of the fourth pump assembly, thereby achieving a cooling effect on the rubber powder; meanwhile, the vortex tube can input hot gas into the heater, when hot air is input into the heater, the air inside the heater can rotate under the drive of a pressure, thereby accelerating the heating efficiency; in addition, when the vortex tube inputs high-temperature gas into the heater, the pressure in the heater increases, so that the pressure in the heater can be relieved by opening the pressure relief valve; and the pressure relief valve is communicated with the spirally arranged heating pipe, therefore, the hot air during pressure relief flows to the heating pipe, thereby ensuring the recycling of resources and achieving the input of hot air into the heater to heat the rubber powder while cooling the rubber powder.

DESCRIPTION OF EMBODIMENTS

Figure 1:
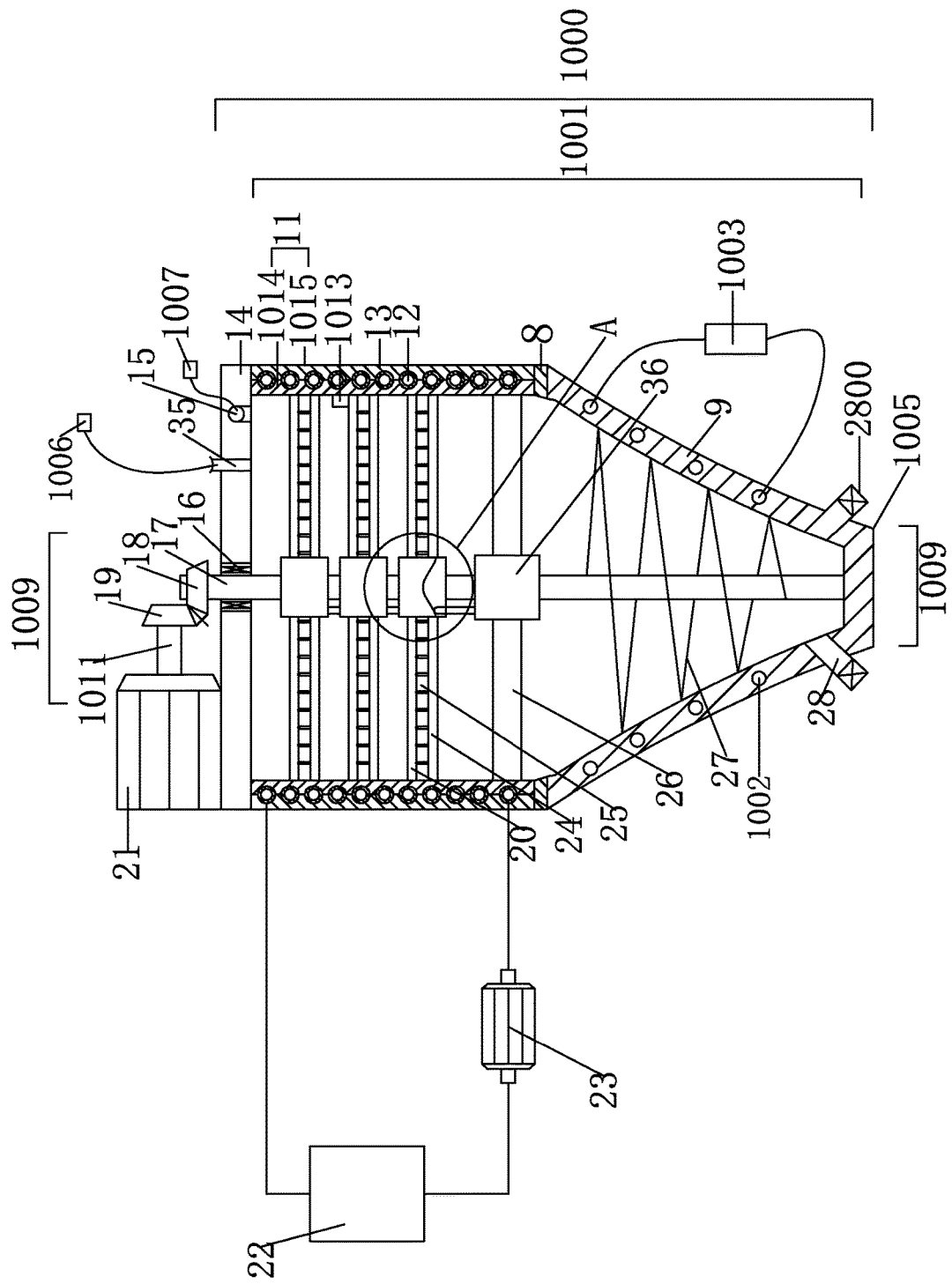
FIG. 1 is a front cross-sectional view of a device for desulfurizing and plasticizing waste rubber according to an embodiment of the present invention.
Figure 2:
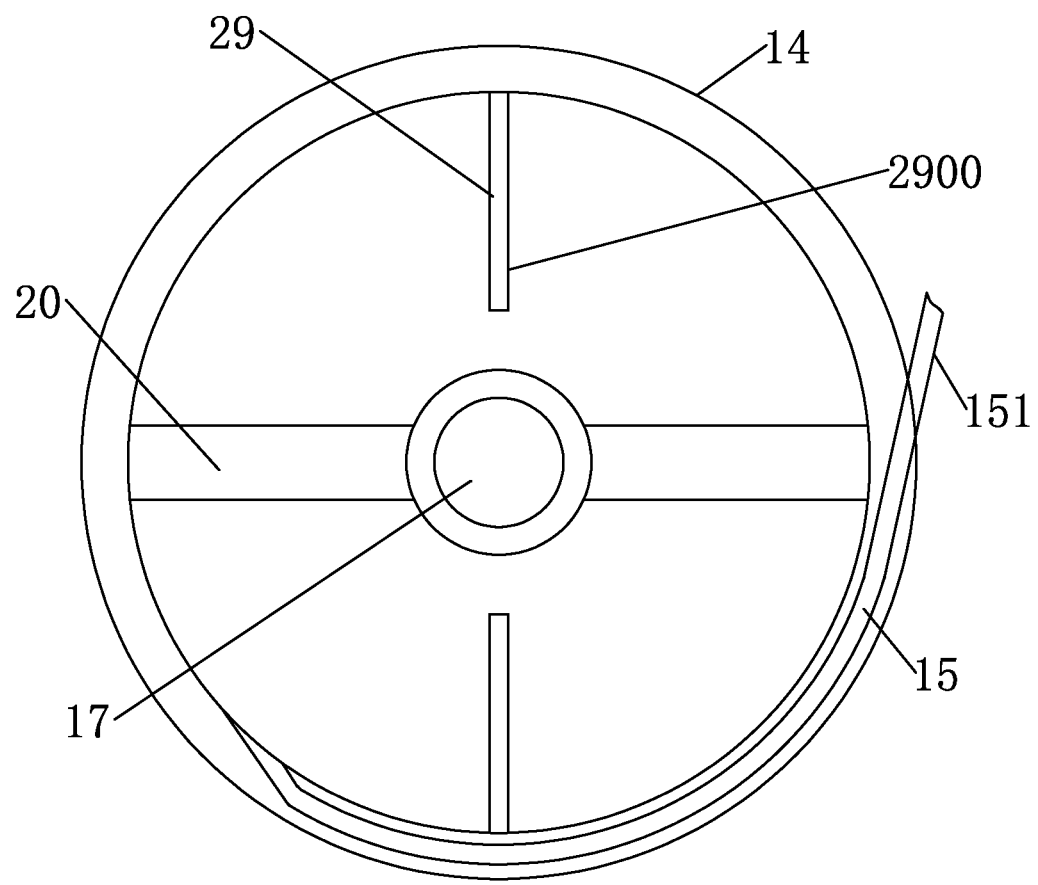
FIG. 2 is a top view of FIG. 1.
Figure 3:
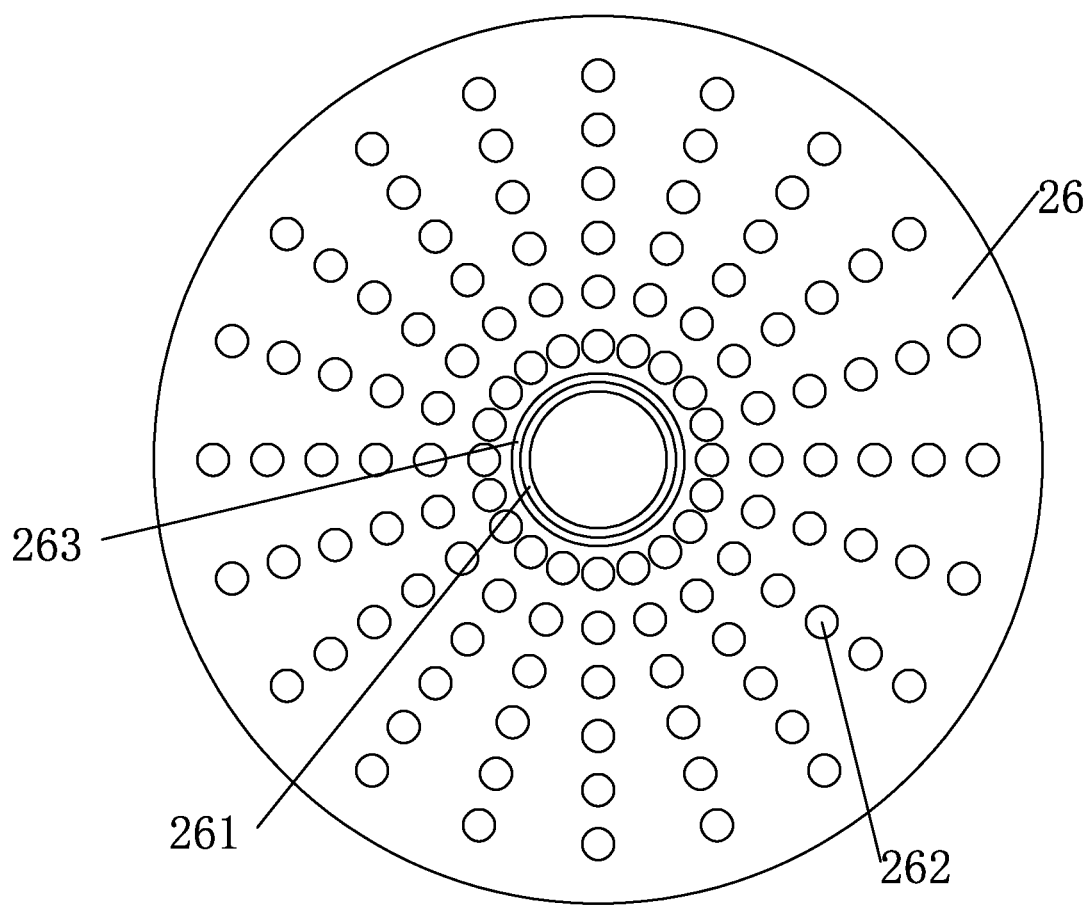
FIG. 3 is a top view of a filter plate in FIG. 1.
Figure 4:
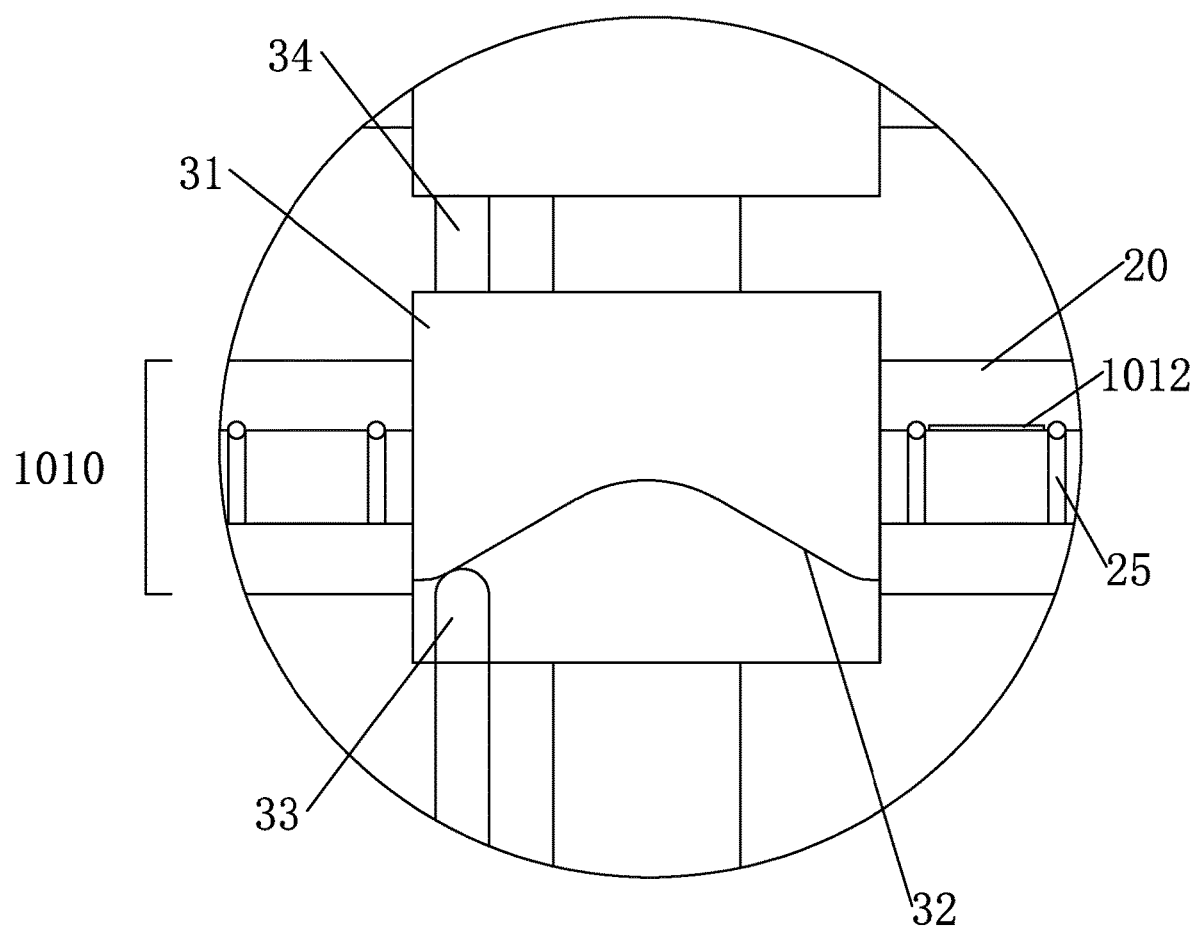
FIG. 4 is a partially enlarged view of A in FIG. 1.

The present invention will be further described below through specific embodiments.

Reference numerals in the drawings of this specification comprise: 8: heat insulation layer, 9: arc barrel, 11: double-layer ring plate, 12: heating pipe, 13: circular barrel, 14: top plate, 15: annular pipe, 151: cutout pipe, 16: first ball bearing, 17: rotating shaft, 18: driven bevel gear, 19: driving bevel gear, 20: first plate, 21: motor, 22: heater, 23: first pump assembly, 24: second plate, 25: shift sheet, 26: filter plate, 261: second ball bearing, 262: filter hole, 263: fixed block, 27: auger blade, 28: spraying pipeline, 29: blocking piece, 31: auxiliary block, 32: arc groove, 33: sliding rod, 34: connecting rod, 35: agent inlet pipeline, 41: vortex tube, 42: fourth pump assembly, 43: pressure relief valve, and 46: diverter connection pipe; and 1000: body, 1001: treatment body, 1002: cooling pipeline, 1003: refrigerator, 1004: discharge port, 1005: closing cover, 1006: second pump assembly, 1007: third pump assembly, 1009: drive assembly, 1010: stirring assembly, 1011: output shaft, 1012: torsion spring, 1013: shift lever, 1014: inner-layer ring plate, 1015: outer-layer ring plate, 2900: through hole, and 2800: one-way valve.

Embodiment 1

Basically as shown in FIGS. 1 to 4: a device for desulfurizing and plasticizing waste rubber comprises a body 1000, wherein the body 1000 comprises a top plate 14 and a treatment body 1001, the treatment body 1001 consists of a circular barrel 13 and an arc barrel 9, the top plate 14 is fixedly connected to a top of the circular barrel 13, the circular barrel 13 is fixedly connected to a top of the arc barrel 9, the circular barrel 13 is communicated with the arc barrel 9, a heat insulation layer 8 is fixedly connected to a connection between the circular barrel 13 and the arc barrel 9, the heat insulation layer 8 is made of asbestos, a barrel wall of the circular barrel 13 is made of double-layer ring plate 11, an outer-layer ring plate 1015 of the double-layer ring plate 11 is made of a thermal insulation material, a spirally arranged heating pipe 12 is fixedly connected to a connection between the inner-layer ring plate 1014 and the outer-layer ring plate 1015, the heating pipe 12 on a lower portion of the double-layer ring plate 11 is communicated with a first pump assembly 23, the first pump assembly 23 is communicated with a heater 22, and an end that is of the heater 22 and that is far away from the pump assembly is communicated with the heating pipe 12 on an upper portion of the double-layer ring plate 11.

An inner diameter of the arc barrel 9 gradually decreases toward a center from top to bottom, a cooling pipeline 1002 is arranged in the barrel wall of the arc barrel 9, the cooling pipeline 1002 is communicated with a refrigerator 1003, a bottom of the arc barrel 9 is provided with a discharge port 1004, a closing cover 1005 is detachably connected to the discharge port 1004, a lower portion that is of the arc barrel 9 and that is close to the discharge port 1004 is circumferentially communicated with a plurality of spraying pipelines 28, and one-way valves 2800 are arranged on the spraying pipelines 28.

A cutout pipe 151 is arranged on the top plate 14, the cutout pipe 151 is cut from a side wall of the top plate 14, one end of the cutout pipe 151 is communicated with a third pump assembly 1007 filled with rubber powder, the other end of the cutout pipe 151 is communicated with an annular pipe 15, the annular pipe 15 is positioned in the side wall of the top plate 14, the annular pipe 15 penetrates through the side wall and a bottom wall of the top plate 14 and is communicated with the inside of the circular barrel 13, a blocking piece 29 is fixedly connected to one end that is of the annular pipe 15 and that is far away from the cutout pipe 151, and a plurality of through holes 2900 are formed on the blocking piece 29; a top of the top plate 14 is communicated with an agent inlet pipeline 35, the agent inlet pipeline 35 is communicated with a second pump assembly 1006 filled with an activating agent and a softening agent; and a drive assembly 1009 is fixedly connected to the top of the top plate 14, the drive assembly 1009 comprises a motor 21, a driving bevel gear 19 is coaxially fixedly connected to an output shaft 1011 of the motor 21, and a driven bevel gear 18 is engaged with the driving bevel gear 19. A stirring assembly 1010 is arranged in the circular barrel, the driven bevel gear 18 is positioned at a center of the top plate 14 and is coaxially and fixedly connected to a rotating shaft 17 from the driven bevel gear 18, the rotating shaft 17 penetrates through the top plate 14 and extends into the arc barrel 9, a first ball bearing 16 is fixedly connected to a contact position between the rotating shaft 17 and the top plate 14, the first ball bearing 16 is sleeved on the rotating shaft 17, and an outer wall of the first ball bearing 16 is fixedly connected to the top plate 14; and an auger blade 27 is fixedly connected to a part that is of the rotating shaft 17 and that extends to the arc barrel 9.

A second ball bearing 261 is sleeved on the rotating shaft 17, the second ball bearing 261 is positioned above the auger blade 27, a fixed block 263 is fixedly connected to an outer wall of the second ball bearing 261, a filter plate 26 is fixedly connected to an outer wall of the fixed block 263, the filter plate 26 is fixedly connected to a side wall of a lower portion of the circular barrel 13, a plurality of filter holes 262 are formed in the filter plate 26, and the filter holes 262 are distributed in a dispersed manner with a center of the filter plate 26 as a base point; a plurality of auxiliary blocks 31 are arranged above the fixed block 263, the auxiliary blocks 31 are vertically and uniformly connected to the rotating shaft 17 by a feather key, two sides of each auxiliary block 31 are symmetrically and fixedly connected to a stirring assembly 1010, the stirring assembly 1010 consists of a first plate 20 and a second plate 24, both the first plate 20 and the second plate 24 contact an inner wall of the circular barrel 13, the first plate 20 is positioned above the second plate 24, a plurality of torsion springs 1012 are uniformly and fixedly connected to a bottom portion of the first plate 20, a shift sheet 25 is fixedly connected to one end that is of the torsion spring 1012 and that is far away from the first plate 20, the shift sheet 25 is positioned between the first plate 20 and the second plate 24, a plurality of shift levers 1013 corresponding to a position of the shift sheet 25 are arranged on a wall of the circular barrel 13, and each shift lever 1013 can contact the shift sheet 25;

a sliding rod 33 is fixedly connected to the top of the fixed block 263, an arc groove 32 corresponding to the sliding rod 33 is arranged at a bottom of the auxiliary block 31 above the fixed block 263, the auxiliary block 31 and the fixed block 263 are vertically matched in a sliding manner through the sliding rod 33 and the arc groove 32, and a connecting rod 34 is fixedly connected between adjacent auxiliary blocks 31. In this embodiment, the first pump assembly 23 is preferably an air pump, and the second pump assembly 1006 and the third pump assembly 1007 are each preferably centrifugal pumps.

The specific implementation process is as follows: during operation, the third pump assembly 1007 is firstly started, and rubber powder flows into the circular barrel 13 from the cutout pipe 151 under the drive of the third pump assembly 1007; meanwhile, since the cutout pipe 151 is cut from the side wall of the top plate 14, other end of the cutout pipe 151 is communicated with the annular pipe 15, and the annular pipe 15 is positioned in the side wall of the top plate 14, the rubber powder can move along a pipe wall of the annular pipe 15, and the rubber powder can flow through the annular pipe 15 at a high speed under the pressure of the third pump assembly 1007, so that large friction is generated between the rubber powder and an inner wall of the annular pipe 15; according to the frictional heat generation, the rubber powder can generate heat, so that the rubber powder can be preheated, which can improve the efficiency of subsequent desulfurization and plasticization operations in one aspect and reduce the loss of the device in another aspect; and since a blocking piece 29 is fixedly connected to one end that is of the annular pipe 15 and that is far away from the cutout pipe 151, and a plurality of through holes 2900 are formed on the blocking piece 29, so that when the rubber powder flows to the blocking piece 29, the rubber powder will dispersedly flow into the circular barrel 13 under a diversion action of the through hole 2900, so that the rubber powder can be uniformly dispersed in the circular barrel 13, and thus the rubber powder is treated uniformly.

After the rubber powder is injected, the second pump assembly 1006 is started, and the activating agent and the softening agent flow into the circular barrel 13 from the agent inlet pipeline 35 under the drive of the second pump assembly 1006; next, the motor 21 is started, the driving bevel gear 19 will rotate under the drive of the motor 21, and therefore, the rotating shaft 17 rotates under the drive of the motor 21 because the driving bevel gear 19 is engaged with the driven bevel gear 18 and the rotating shaft 17 is coaxially and fixedly connected to the driven bevel gear 18, so that the stirring assembly 1010 can stir the rubber powder under the drive of a motor 21 and mix the rubber powder with the activating agent and the softening agent; meanwhile, the first pump assembly 23 is started, gas flows into the heater 22 under the drive of the first pump assembly 23, and the heated gas flows into the heating pipe 12, so that the temperature of the circular barrel 13 increases, and the rubber powder will be desulfurized and plasticized under a high temperature and stirring by the stirring assembly 1010; and the temperature is controlled at 150° C. during the plasticizing process.

When the rubber powder is plasticized to a suitable size, the rubber powder will flow to the arc barrel 9 along with the filter holes 262, wherein the barrel wall of the arc barrel 9 is arc, and an inner diameter of the arc barrel 9 gradually decreases toward a center from top to bottom, so the plasticized rubber powder will flow to the bottom under the push of the auger blade 27, and the residue at the four corners will be reduced; meanwhile, the refrigerator 1003 is started to fill the cooling pipeline 1002 with cold air, then the rubber powder in the arc barrel 9 is cooled and plasticized, when the plasticized rubber powder needs to be output, the one-way valve 2800 is opened, the plasticized rubber powder will flow out along with the spraying pipeline 28, and the plurality of spraying pipelines 28 are circumferentially arranged, so that in one aspect, collection of plasticized rubber powder can be facilitated, and in another aspect, outflow of the plasticized rubber powder can be accelerated; and meanwhile, the closing cover 1005 can be opened, the plasticized rubber powder remaining at the bottom of the arc barrel 9 can be taken out, thereby reducing the condition that a large amount of plasticized rubber powder is remained in the arc barrel 9.

When the rotating shaft 17 rotates, the first plate 20 and the second plate 24 rotate under the drive of the rotating shaft 17; meanwhile, since the shift sheet 25 is arranged between the first plate 20 and the second plate 24 and the shift lever 1013 that can contact the shift sheet 25 is arranged on a wall of the circular barrel 13, the shift sheet 25 will contact the shift lever 1013 during rotation, then the shift sheet 25 is twisted forward under the fluctuation of the shift lever 1013, and part of the rubber powder is shifted under the twisting of the shift sheet 25, so that the rubber powder can be fully mixed and desulfurized and plasticized in the circular barrel 13, the desulfurization and plasticization efficiency of the rubber powder is accelerated; and then since a torsion spring is arranged on the shift sheet 25, when the shift lever 1013 is far away from the shift sheet 25, the shift sheet 25 will return to its original position, and the next shift operation cannot be affected.

When the rotating shaft 17 rotates, with the design of the sliding rod 33 and the arc groove 32, the arc groove 32 on the auxiliary block 31 also rotates, when a higher position of the arc groove 32 contacts the sliding rod 33, the auxiliary block 31 moves upwards under a pushing action of the sliding rod 33, and the connecting rod 34 is fixedly connected between adjacent auxiliary blocks 31, so that a plurality of auxiliary blocks 31 vertically move upwards under the pushing action of the sliding rod 33, and the first plate 20 and the second plate 24 vertically move upwards; and next, when the higher position of the arc groove 32 is separated from the sliding rod 33, the auxiliary block 31 moves vertically downwards under the action of gravity with the disappearance of a support force, and then the sliding rod 33 contacts a lower position of the arc groove 32, so that the first plate 20, the second plate 24 and the auger blade 27 perform vertical reciprocating motion under the vertical matching of the sliding rod 33 and the arc groove 32.

Therefore, under the vertical reciprocating motion of the first plate 20 and the second plate 24, the rubber powder in the circular barrel 13 can be stirred uniformly, so that part of the rubber powder falling to the lower portion can be stirred again, the staying time of the rubber powder at the upper portion of the circular barrel 13 in the circular barrel 13 can be prolonged, the rubber powder is sufficiently heated and plasticized at a high temperature, and the sufficiently plasticized rubber powder at the lower part of the circular barrel 13 moves to the filter plate 26 under the extrusion of the first plate 20 and the second plate 24, so that the rubber plasticizing efficiency is accelerated; moreover, since the first plate 20 and the second plate 24 contact the inner wall of the circular barrel 13, when the first plate 20 and the second plate 24 vertically move upwards, the first plate and the second plate can scrape the plasticized rubber powder adhered to the inner wall of the circular barrel 13, so that the condition that the rubber powder is remained on the inner wall of the circular barrel 13 can be reduced; and meanwhile, under the vertical reciprocating motion of the auger blade 27, the auger blade 27 can accelerate the flow efficiency of the plasticized rubber powder flowing into the arc barrel 9, so that the output efficiency of the rubber powder is improved.

Then, since the heating pipe 12 at the lower portion of the double-layer ring plate 11 is communicated with the first pump assembly 23, the hot gas in the heating pipe 12 will flow to the first pump assembly 23, so that the recycling of the gas can be achieved, and the waste of resources can be reduced to a greater extent.

Embodiment 2

Figure 5:
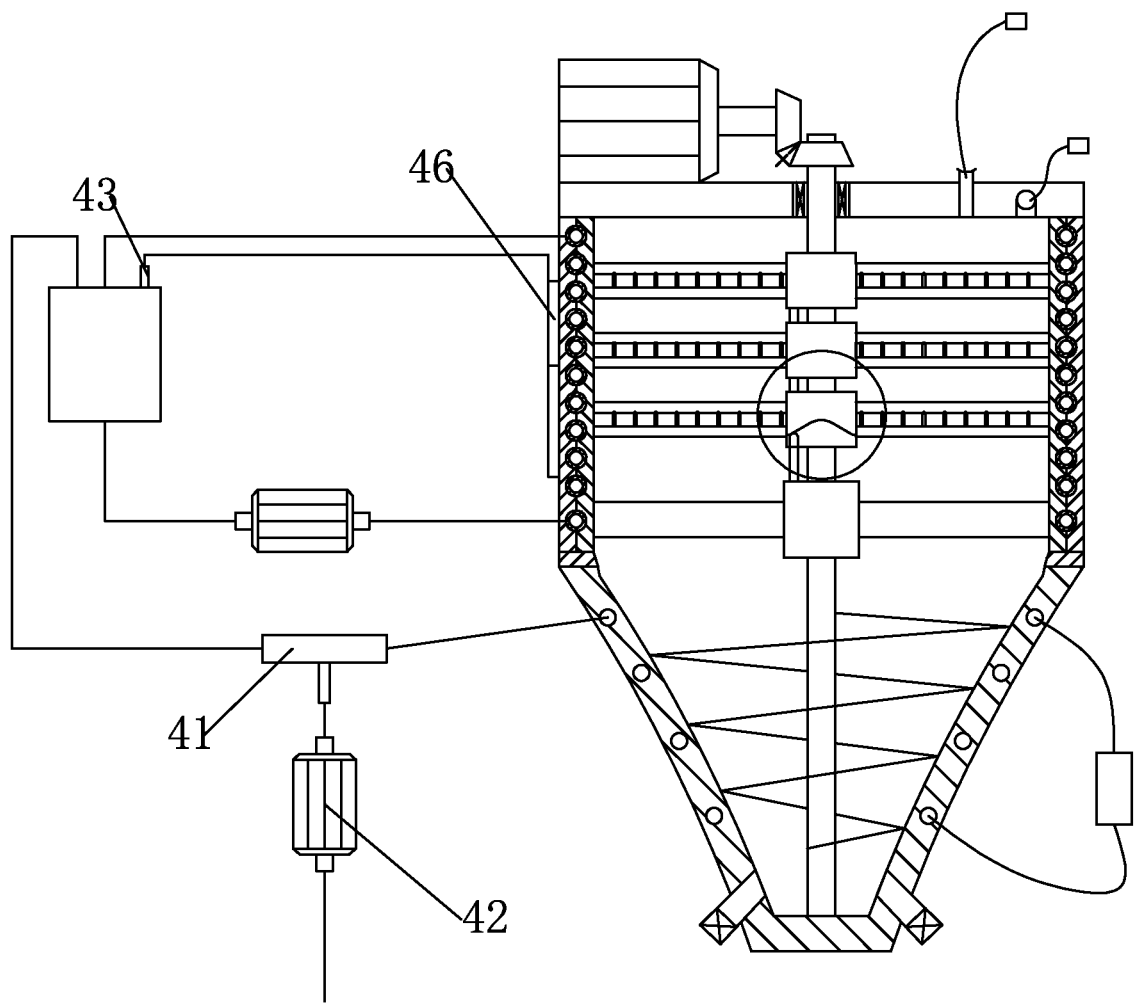
FIG. 5 is a front cross-sectional view of Embodiment 2.

This embodiment differs from the above embodiment in that, as shown in FIG. 5, the device for desulfurizing and plasticizing waste rubber further comprises a fourth pump assembly 42, the fourth pump assembly 42 is communicated with a vortex tube 41, two ends of the vortex tube 41 are respectively a cold air end and a hot air end, the cold air end of the vortex tube 41 is communicated with the cooling pipeline 1002, the hot air end of the vortex tube 41 is communicated with the heater 22, the heater 22 is communicated with a pressure relief valve 43, the pressure relief valve 43 is communicated with a diverter connection pipe 46, and the diverter connection pipe 46 is arranged on the heat insulation layer. In this embodiment, the fourth pump assembly 42 is preferably a high pressure air pump.

The specific implementation process is as follows: with the design of the vortex tube 41, the vortex tube 41 can input cold air into the cooling pipeline 1002 under the drive of the fourth pump assembly 42, thereby achieving a cooling effect on the rubber powder; meanwhile, the vortex tube 41 can input hot gas into the heater 22, when hot air is input into the heater 22, the air inside the heater 22 can rotate under the drive of a pressure, thereby accelerating the heating efficiency; in addition, when the vortex tube 41 inputs high-temperature gas into the heater 22, the pressure in the heater 22 increases, so that the pressure in the heater 22 can be relieved by opening the pressure relief valve 43, wherein since the diverter connection pipe 46 is arranged outside the heat insulation layer, the hot air during pressure relief will heat the environment around the device through the diverter connection pipe 46, thereby reducing the probability of temperature reduction inside the device, ensuring the recycling of resources and achieving the input of hot air into the heater 22 to heat the rubber powder while cooling the rubber powder.

It should be noted that, in the present invention, relational terms such as "first" and "second" are merely used to distinguish one entity or operation from another entity or operation without necessarily requiring or implying any actual relationship or order between such entities or operations. Moreover, terms "include", "comprise", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device.

The above descriptions are merely embodiments of the present invention, and the common general knowledge of the known specific structures and characteristics in the solution is not described herein. Those of ordinary skill in the art know all the common technical knowledge in the technical field to which the invention belongs before the filing date or priority date, can understand all the existing technologies in the field, and have the ability to apply conventional experimental methods before that date. Those of ordinary skill in the art can perfect and implement this solution based on their own abilities under the inspiration given by the present application. Some typical well-known structures or well-known methods should not be an obstacle for those of ordinary skill in the art to implement the present application. It should be noted that various changes and modifications can be made by those skilled in the art without departing from the spirit of the present invention. These changes and modifications should also be regarded as the protection scope of the present invention, and will not affect the implementation effect of the present invention and the practicality of the patent. The protection scope claimed in the present application shall be based on the content of the claims, and the specific implementation modes and other descriptions in this specification may be used to interpret the content of the claims.

What is claimed is:

1. A device for desulfurizing and plasticizing waste rubber, comprising:
   a body, wherein the body comprises a top plate, a treatment body and a first pump assembly, the treatment body consists of a circular barrel and an arc barrel, the top plate is fixedly connected to a top of the circular barrel, the circular barrel is fixedly connected to a top of the arc barrel, the circular barrel is communicated with the arc barrel, a heat insulation layer is fixedly connected to a connection between the circular barrel and the arc barrel, a barrel wall of the circular barrel is made of a double-layer ring plate, the double-layer ring plate comprises an inner-layer ring plate and an outer-layer ring plate, a heating pipe spirally arranged is fixedly connected to a connection between the inner-layer ring plate and the outer-layer ring plate, the heating pipe on an upper portion of the double-layer ring plate is communicated with the first pump assembly, and a heater is communicated between the heating pipe and the first pump assembly; and a cooling pipeline is arranged in a barrel wall of the arc barrel, the cooling pipeline is communicated with a refrigerator, a discharge port is formed in a bottom of the arc barrel, and a closing cover is detachably connected to the discharge port;

a top of the top plate is communicated with an agent inlet pipeline, the agent inlet pipeline is communicated with a second pump assembly filled with an activating agent and a softening agent, a cutout pipe is arranged on the top plate, the cutout pipe is cut from a side wall of the top plate, one end of the cutout pipe is communicated with a third pump assembly filled with rubber powder, the other end of the cutout pipe is communicated with an annular pipe, the annular pipe is positioned in the side wall of the top plate, and the annular pipe penetrates through the side wall and a bottom wall of the top plate and is communicated with the inside of the circular barrel; and a stirring assembly is arranged in the circular barrel, and a drive assembly that drives the stirring assembly is arranged on the top of the circular barrel;

the drive assembly comprises a motor, the motor is fixedly connected to the top of the top plate, a driving bevel gear is coaxially fixedly connected to an output shaft of the motor, a driven bevel gear is engaged with the driving bevel gear, the driven bevel gear is positioned at a center of the top plate and is coaxially fixedly connected to a rotating shaft, when the motor is started, the driving bevel gear rotates, and the rotating shaft rotates with the cooperation of the driven bevel gear;

the stirring assembly comprises a rotating shaft driven by the drive assembly, the rotating shaft penetrates through the top plate and extends to the arc barrel, a first ball bearing is fixedly connected to a contact position between the rotating shaft and the top plate, the first ball bearing is sleeved on the rotating shaft, and an outer wall of the first ball bearing is fixedly connected to the top plate; a part that is of the rotating shaft and that is positioned at the circular barrel is connected to a plurality of auxiliary blocks by a feather key, stirring assemblies are symmetrically and fixedly connected to two sides of each of the auxiliary blocks, and an auger blade is fixedly connected to a part that is of the rotating shaft and that extends to the arc barrel; the rotating shaft rotates under the drive of the drive assembly, the stirring assembly stirs the rubber powder under the drive of the motor to mix the rubber powder with the activating agent and the softening agent; and meanwhile, the auger blade drives the plasticized rubber powder to be output;

a second ball bearing is sleeved on the rotating shaft, the second ball bearing is positioned above the auger blade, a fixed block is fixedly connected to an outer wall of the second ball bearing, a filter plate is fixedly connected to an outer wall of the fixed block, the filter plate is fixedly connected to a side wall of a lower portion of the circular barrel, a plurality of filter holes are formed in the filter plate, and the filter holes are distributed in a dispersed manner with a center of the filter plate as a base point; and after being plasticized, the rubber powder flows to the filter holes and then flows to a middle because the filter holes are distributed in a dispersed manner with the center of the filter plate as the base point.

2. The device for desulfurizing and plasticizing waste rubber according to claim 1, wherein the stirring assembly consists of a first plate and a second plate, both the first plate and the second plate contact an inner wall of the circular barrel, the first plate is positioned above the second plate, a plurality of torsion springs are uniformly and fixedly connected to a bottom portion of the first plate, a shift sheet is fixedly connected to one end that is of the torsion spring and that is far away from the first plate, the shift sheet is positioned between the first plate and the second plate, a plurality of shift levers corresponding to a position of the shift sheet are arranged on a wall of the circular barrel, and each shift lever can contact the shift sheet.

3. The device for desulfurizing and plasticizing waste rubber according to claim 2, wherein a sliding rod is fixedly connected to the top of the fixed block, an arc groove corresponding to the sliding rod is arranged inside the auxiliary block positioned above the fixed block, the auxiliary block and the fixed block are vertically matched in a sliding way through the sliding rod and the arc groove, and a connecting rod is fixedly connected between adjacent auxiliary blocks.

4. The device for desulfurizing and plasticizing waste rubber according to claim 3, wherein a blocking piece is fixedly connected to one end that is of the annular pipe and that is far away from the cutout pipe, and a plurality of through holes are formed on the blocking piece.

5. The device for desulfurizing and plasticizing waste rubber according to claim 4, wherein a lower portion that is of the arc barrel and that is close to the discharge port is circumferentially communicated with a plurality of spraying pipelines, and one-way valves are arranged on the spraying pipelines.

6. The device for desulfurizing and plasticizing waste rubber according to claim 5, wherein the other end of the first pump assembly is communicated with a heating pipe at a lower portion of the double-layer ring plate.

7. The device for desulfurizing and plasticizing waste rubber according to claim 6, further comprising a fourth pump assembly, wherein the fourth pump assembly is communicated with a vortex tube, two ends of the vortex tube are respectively a cold air end and a hot air end, the cold air end is communicated with the cooling pipeline, the hot air end is communicated with the heater, the heater is communicated with a pressure relief valve, the pressure relief valve is communicated with a diverter connection pipe, and the diverter connection pipe is communicated with the spirally arranged heating pipe.

* * * * *